United States Patent [19]

Blake

[11] 4,103,284

[45] Jul. 25, 1978

[54] BUMPER MOUNTED VEHICLE OBSTACLE DETECTOR

[76] Inventor: Raymond John Blake, 311 Shoemaker La., Solana Beach, Calif. 92075

[21] Appl. No.: 827,602

[22] Filed: Aug. 25, 1977

[51] Int. Cl.² .............................................. B60Q 5/00

[52] U.S. Cl. .................................... 340/61; 200/61.44

[58] Field of Search ............ 340/61; 200/61.41, 61.42, 200/61.44

[56] References Cited

U.S. PATENT DOCUMENTS

| | | | |
|---|---|---|---|
| 2,592,742 | 4/1952 | Rose | 200/61.44 |
| 3,037,187 | 5/1962 | Blakistone | 340/61 |

*Primary Examiner*—Alvin H. Waring

*Attorney, Agent, or Firm*—Brown & Martin

[57] ABSTRACT

The detector is a watertight unit that is easily secured on or through a vehicle bumper, or other extremity, to sense and give warning of obstacles in the path of the vehicle. Warning is given by either head on or oblique contact of a detector probe with the interference. Advance time of such warning may be altered by changing the length of the probe. The detector contains an electrical switch, closed by probe displacement, to activate the available vehicle horn. Utilizing independently powered equipment provides the warning quickly and without the need of significant and/or prolonged relative motion between the vehicle and the obstacle. The invention is readily adaptable for use on fixed objects to provide warning of vehicle approach.

3 Claims, 6 Drawing Figures

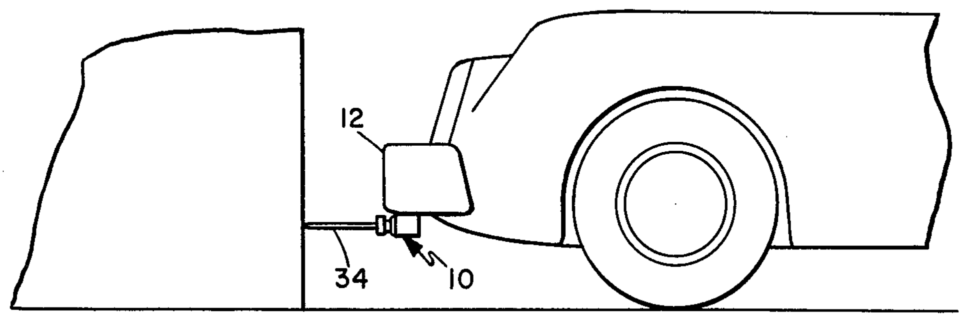
Fig. 1
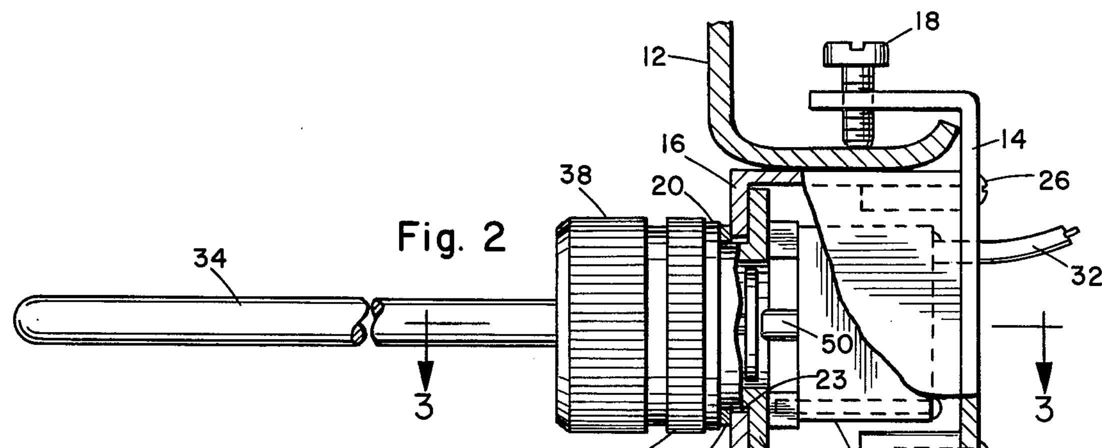
Fig. 2
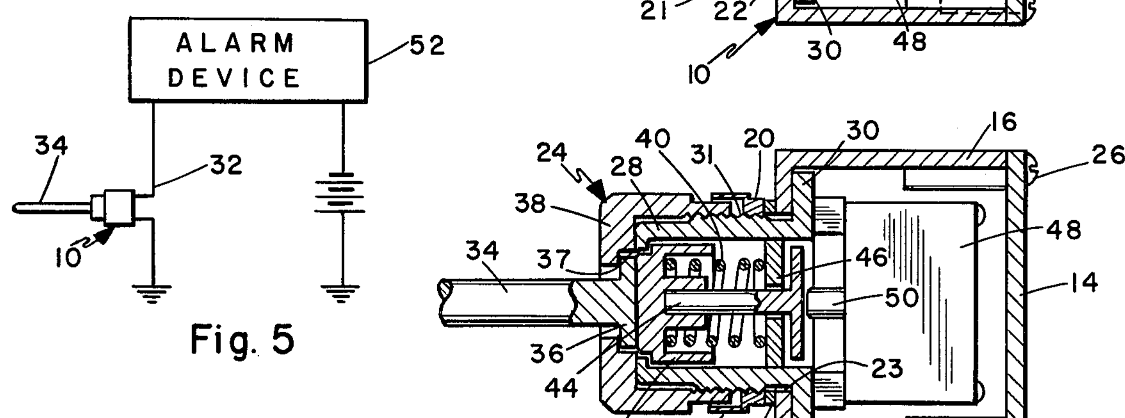
Fig. 3
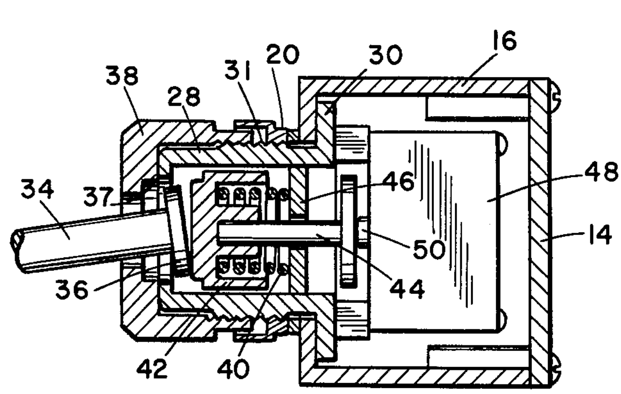
Fig. 4
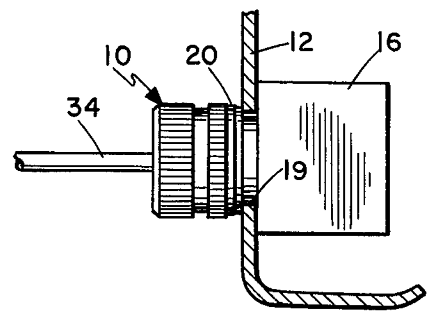
Fig. 6
Fig. 5

BUMPER MOUNTED VEHICLE OBSTACLE DETECTOR

BACKGROUND OF THE INVENTION

There is a continuing requirement for maneuvering pleasure and working vehicles in confined spaces such as in parking, positioning and load handling. It is often the case, that the operator cannot clearly see the ends of his vehicle or potential obstacles in the path of movement.

Decorative or utilitarian features of driver occupied and adjacent vehicles, or fixed objects, are all expensive to repair, and are easily and frequently damaged by vehicle operation, particularly in close quarters. In loading, and similar working situations, it is important to position the vehicle quickly and precisely even though the operator cannot observe the relationships as he maneuvers. Resonant devices such as spring feelers or bumper and fender "Whiskers" are limited by their mounting, fixed length, and dependence upon significant abrasive relative motion between the feeler and the obstacle.

It is desirable, therefore, to have a detector that will sense the presence of an obstacle that is approached from head on, or any angle, and that will quickly give a positive audible warning independent of relative motion. Such a device is particularly desirable where the result is attained without requiring additional parts by utilizing the existing vehicle horn as a warning device.

Additional desirable features of the invention include integrity from water and road hazards, compactness, and ease of mounting on or through the vehicle bumper or other exterior component. The detector is versitile in that warning time to obstacle contact may be easily varied, and the sensitivity of the device changed to fit anticipated conditions or requirements.

The detector is adaptable for use on fixed objects requiring protection from vehicle movement. It may also be used to activate a wide variety of warning sounds, displays, or signals. In vehicle application, its control feature could be used to shut down motive power.

SUMMARY OF THE INVENTION

In an exemplary embodiment, the unit incorporates a control switch that is activated by displacement of a probe extending from the unit in the direction to be protected. The control switch is connected to vehicle wiring so as to sound the horn when closed. An integral spring biased follower assembly positions the probe in the neutral, switch open position, and also transmits the motion of probe displacement so as to close the switch.

The detector is easily mounted on the ends of the vehicle or perimeter equipment, and is adaptable for use with stationary objects requiring protection.

It is therefore an object of the invention to provide a new and improved detector for warning a vehicle operator of the proximity of an obstacle.

A further object of the invention is to provide a detector that will sense head on or oblique contact with an obstacle.

A further object of the invention is to provide a detector which will provide a quick and positive audible warning to the operator by sounding the vehicle horn.

A further object of the invention is to provide a detector capable of modification to provide different time before impact warnings and of selected sensitivity.

A further object of the invention is to provide a detector which is compact, watertight, and easily mounted.

A further object of the invention is to provide a detector capable of activating a variety of alarm signals or displays, and adaptable to use on fixed objects.

Other objects and advantages will be apparent in the following detailed description, considered in conjunction with the accompanying drawings, in which:

FIG. 1 illustrates the detector unit attached to a vehicle.

FIG. 2 is an enlarged side elevation view, with portions cut away, showing the mounting of the detector on a vehicle bumper.

FIG. 3 is a sectional view taken on line 3—3 of FIG. 2 and showing internal components.

FIG. 4 is a similar sectional view, but with the detection probe displaced.

FIG. 5 is a schematic wiring diagram of the unit indicating the function of the control switch.

FIG. 6 illustrates an alternate mounting arrangement of the detector. It represents the detector installed through an opening in the bumper.

DESCRIPTION OF THE PREFERRED EMBODIMENT

FIG. 1 shows the detector assembly 10 mounted to the front bumper 12 of a passenger vehicle. FIG. 2 depicts one mounting arrangement detail wherein the detector assembly is attached at the lower bumper lip. In this method, the detector assembly is held to the bumper by clamping a portion of the bumper between an extension of the detector housing access cover 14 and the detector housing 16 by tightening of cap screw 18.

FIG. 6 depicts an alternate method of bumper mounting. This attachment is made by passing a portion of the detector through an opening 19 in the bumper 12 and securing the detector housing 16 against the interior bumper face by tightening threaded locking ring 20. Detector housing seal 22, placed between the locking ring and the bumper face, provides for the internal integrity of the detector assembly.

The detector assembly 10 is built up by joining subassemblies as shown in FIGS. 3 and 4 and as will now be described. The detector housing 16 is a hollow cube shaped piece. One face of the detector housing is provided with a circular opening 23 for attachment of the follower assembly 24. The opposite face of the detector housing is provided with a removable access cover 14 with closure made by assembly screws 26.

The follower housing 28 is a cylindrical element provided with a flanged end 30, and having an exterior threaded portion 31. It is attached by being passed through the opening 23 in the face of the detector housing and having the flange 30 drawn against the inside face of the detector housing by tightening of locking ring 20. This joint is sealed by detector housing seal 22. The follower assembly is closed by probe cap 38 engaging the exterior threads 31 of the follower housing. Locking ring 20 is provided with a skirt 21 that covers a portion of the probe cap to provide a seal for the follower assembly.

Probe 34 is a rod rounded on one end and provided with a disc 36 at the other. The probe is preferably of a resilient material so that is will deform after contact with an object and return to its original shape when pressure is removed. It is passed through a circular opening in the probe cap 38 before attachment of said cap to the follower housing. The probe disc 36 fits into a recess 37 in the probe cap with a loose fit to permit displacement. Probe 34 is held in the neutral position by the probe follower 42.

The probe follower 42 is a cup shaped piece with an internal column having a recess into which is force fitted one end of push rod 44. Positioning spring 40 is mounted in the annual space around the internal column of the probe follower and bears against the spring backing plate 46 which is force fitted in the follower housing. Compression of the positioning spring maintains the probe in the neutral position.

Switch 48 is mounted in the detector housing such that its contact point 50 is in line with the end of push rod 44. The electrical lead 32 of the switch is connected in the vehicle circuitry so as to actuate the vehicle horn 52, as indicated in FIG. 5.

OPERATION

The control switch is normally open. The probe is maintained in the neutral position by the probe follower mechanism in the absence of obstacle contact as shown in FIG. 3. FIG. 4 depicts probe obstacle contact. Movement of the probe causes displacement of disc 36. This causes movement of the probe follower 42 against the positioning spring 40. Movement of the probe follower moves the attached push rod 44. Displacement of the rod closes the control switch 48 sounding the vehicle horn. Flexibility is available in the detector design by use of probes of varying length for altering warning distance. Sensitivity of the detector may be altered by use of positioning springs of varying strength.

Having described my invention, I now claim:

1. A vehicle mounted obstacle detector to provide positive warning of the close approach of the vehicle to obstacles comprising:

a resilient cylindrical probe for contacting obstacles, of selected length rounded on one end and with an attached disc on the opposite end, a follower housing shaped as a hollow cylindrical element with a mounting flange at one end and having exterior threads, a probe cap with a centered hole through which said cylindrical probe passes and having an internal recess into which said probe disc fits loosely to permit the displacement of said disc when said probe encounters an obstacle, said probe cap being provided with internal threads to engage the external threads on said follower housing and closing one end of said follower housing when threaded thereon, a probe follower formed as a cup shaped piece with a recessed interior column and having a closed end bearing against said probe disc to transmit any displacement of said probe disc, a follower push rod attached at one end in said probe follower column recess and provided with a flange at the opposite end, a circular spring backing plate with a centered hole through which said push rod passes, said backing plate being forced fitted into and closing the other end of said follower housing, a positioning spring placed between the interior base of said probe follower, surrounding said probe follower internal column, and compressed against said spring backing plate, a cubical detector housing having a removable access cover forming one side thereof and with a circular opening in the opposite side permitting the passage of said follower housing through said detector housing, an internally threaded locking ring engaging said exterior threads of said follower housing and securing said follower housing mounting flange against the interior face of said detector housing, said locking ring being provided with an external seal skirt to overlap the threaded end of said probe cup, a detector housing seal positioned between said locking ring and the adjacent detector housing exterior face, a normally open electrical control switch mounted within said detector housing and positioned to be in cooperative alignment with said follower push rod flange for closure by movement of said push rod, means for electrically connecting said control switch in parallel connection in the vehicle horn circuitry for sounding the vehicle horn when said switch is closed, and means for mounting said detector housing on the vehicle.

2. A vehicle mounted obstacle detector according to claim 1 wherein:

said vehicle mounting means comprises a detector housing access cover secured to and closing one side of said detector housing and provided with a right angle extension containing a threaded aperture, a threaded cap screw threaded in the aperture of said extension and operable toward and away from said housing for clamping said housing to the structure of said vehicle.

3. A vehicle mounted obstacle detector according to claim 1 wherein:

the means for mounting said detector housing on the vehicle comprises a locking ring threaded on the exterior of said follower housing after it is passed through an opening made in the vehicle structure to clamp said detector housing to the structure.

* * * * *